United States Patent
Chien et al.

(10) Patent No.: US 12,488,492 B2
(45) Date of Patent: Dec. 2, 2025

(54) METHOD OF OBTAINING BRIGHTNESS INFORMATION OF DISPLAY PANEL AND RELATED PANEL DETECTION SYSTEM

(71) Applicant: NOVATEK Microelectronics Corp., Hsin-Chu (TW)

(72) Inventors: Yu-Yi Chien, New Taipei (TW); Shih-Hsuan Chen, Taoyuan (TW); Wen-Lung Hung, Hsinchu (TW); Po-Yuan Hsieh, Hsinchu (TW)

(73) Assignee: NOVATEK Microelectronics Corp., Hsin-Chu (TW)

( * ) Notice: Subject to any disclaimer, the term of this patent is extended or adjusted under 35 U.S.C. 154(b) by 36 days.

(21) Appl. No.: 18/129,089

(22) Filed: Mar. 31, 2023

(65) Prior Publication Data
US 2024/0331185 A1    Oct. 3, 2024

(51) Int. Cl.
*G06T 7/70* (2017.01)
*G01J 3/50* (2006.01)
*G06T 5/20* (2006.01)
*G06T 7/90* (2017.01)

(52) U.S. Cl.
CPC ............... *G06T 7/70* (2017.01); *G01J 3/506* (2013.01); *G06T 5/20* (2013.01); *G06T 7/90* (2017.01); *G06T 2207/10024* (2013.01); *G06T 2207/20081* (2013.01); *G06T 2207/20084* (2013.01)

(58) Field of Classification Search
CPC .... G06T 7/70; G06T 5/20; G06T 7/90; G06T 2207/10024; G06T 2207/20081; G06T 2207/20084; G01J 3/506
See application file for complete search history.

(56) References Cited

U.S. PATENT DOCUMENTS

| | | | |
|---|---|---|---|
| 11,483,479 B1* | 10/2022 | Li | H04N 23/687 |
| 2011/0317914 A1 | 12/2011 | Omer | |
| 2012/0105655 A1* | 5/2012 | Ishii | G06T 5/73 |
| | | | 348/208.4 |
| 2014/0204110 A1* | 7/2014 | Miki | G09G 5/10 |
| | | | 345/589 |
| 2017/0103694 A1* | 4/2017 | Kim | G09G 3/006 |
| 2017/0301075 A1* | 10/2017 | Chiang | G06T 5/94 |
| 2019/0149808 A1* | 5/2019 | Ng | H04N 13/327 |
| | | | 348/59 |
| 2021/0193066 A1* | 6/2021 | Anand | G09G 3/3648 |

FOREIGN PATENT DOCUMENTS

| | | |
|---|---|---|
| CN | 111295700 | 3/2023 |
| TW | 200725545 | 7/2007 |

* cited by examiner

*Primary Examiner* — Kyu Chae
(74) *Attorney, Agent, or Firm* — Winston Hsu (57) ABSTRACT

A method of obtaining brightness information of a display panel having a plurality of pixels includes steps of: obtaining positioning information indicating positions of the plurality of pixels on a test picture; lighting up the plurality of pixels and capturing the test picture; measuring the plurality of pixels according to the positioning information, to obtain a light intensity distribution of each of the plurality of pixels in the test picture; and calculating the brightness information of each of the plurality of pixels according to the light intensity distribution.

22 Claims, 6 Drawing Sheets

All pixels are lit up

FIG. 6

METHOD OF OBTAINING BRIGHTNESS INFORMATION OF DISPLAY PANEL AND RELATED PANEL DETECTION SYSTEM

BACKGROUND OF THE INVENTION

1. Field of the Invention

The present invention relates to a method of obtaining brightness information of a display panel, and more particularly, to a method of obtaining brightness information of a light-emitting diode (LED) panel or an organic LED (OLED) panel.

2. Description of the Prior Art

Light-emitting diodes (LEDs) and organic LEDs (OLEDs) are widely used in various display devices such as television screens, computer monitors, outdoor displays, and portable systems such as mobile phones and handheld game consoles. Due to the process variations and/or device variations of LEDs/OLEDs, the LED and OLED display panels easily encounter the problem of brightness non-uniformity, which may degrade visual effects. Therefore, it is necessary to calibrate or compensate for the brightness characteristics of LEDs/OLEDs pixel by pixel, and brightness detection before calibration or compensation is required.

However, with the trends of large scale and high resolution of the LED/OLED display panel, the pixel density and panel size may increase significantly, which makes the brightness detection more difficult. For example, the received image during the brightness detection may be quite blurry since adjacent LEDs/OLEDs are close and their emitted lights are mixed. In order to improve this problem, the image with brightness information should be captured by using an expensive camera with ultra-high resolution, or the brightness information of a large splicing screen may be obtained by capturing a great number of pictures. These operations generate larger burdens and higher costs on the production process of the display panel.

SUMMARY OF THE INVENTION

It is therefore an objective of the present invention to provide a method of obtaining the brightness information of a light-emitting diode (LED) panel or an organic LED (OLED) panel, in order to solve the abovementioned problems.

An embodiment of the present invention discloses a method of obtaining brightness information of a display panel which comprises a plurality of pixels. The method comprises steps of: obtaining positioning information indicating positions of the plurality of pixels on a test picture; lighting up the plurality of pixels and capturing the test picture; measuring the plurality of pixels according to the positioning information, to obtain a light intensity distribution of each of the plurality of pixels in the test picture; and calculating the brightness information of each of the plurality of pixels according to the light intensity distribution.

Another embodiment of the present invention discloses a panel detection system, which comprises a display panel, a controller, a 2-dimensional brightness detector and a processor. The display panel comprises a plurality of pixels. The controller, coupled to the display panel, lights up the plurality of pixels. The 2-dimensional brightness detector captures a test picture when the plurality of pixels are lit up. The processor, coupled to the controller and the 2-dimensional brightness detector, obtains positioning information indicating positions of the plurality of pixels on the test picture; measures the plurality of pixels according to the positioning information, to obtain a light intensity distribution of each of the plurality of pixels in the test picture; and calculates brightness information of each of the plurality of pixels according to the light intensity distribution.

These and other objectives of the present invention will no doubt become obvious to those of ordinary skill in the art after reading the following detailed description of the preferred embodiment that is illustrated in the various figures and drawings.

DETAILED DESCRIPTION

As described above, brightness detection may be performed on the light-emitting diodes (LEDs) or organic LEDs (OLEDs) on a display panel, so as to achieve the purpose of brightness calibration or compensation. In general, a camera may be applied to capture a picture of the display panel when the LEDs/OLEDs are lit up, and thereby obtain the light spot generated by the LED/OLED in each pixel. The brightness information may be brought out from the light spot.

However, in a high-resolution display panel where the pixel pitch becomes smaller, the lights emitted by adjacent LEDs/OLEDs may interfere with each other to generate a blurry image; hence, it is difficult to obtain the brightness information by using the conventional approaches. In such a situation, several methods are disclosed for dealing with the brightness measurement. For example, a camera with ultra-high resolution may be applied to capture the picture, allowing the lights of adjacent LEDs/OLEDs to be differentiated successfully. However, the camera with ultra-high resolution is usually expensive and may significantly increase the manufacturing expenses, and it may not be easy to find a camera with enough resolution in the market. In another example, the LEDs/OLEDs may be lit up with regular spacing, where in a row or column, one of every two or three pixels is lit up. In this manner, the obtained picture should be clear by using a general camera. However, this method requires that one display panel is captured at least 4 times or 9 times based on the light-up spacing, thereby increasing the time consumption for brightness detection. This is unfavorable in mass production.

The present invention provides a novel method of obtaining the brightness information of a LED/OLED panel, to facilitate the subsequent brightness calibration. First, the positioning information of the LEDs/OLEDs included in the pixels may be obtained, so as to determine the positions of the LEDs/OLEDs in the picture. Based on the positioning information, in the captured picture where the light spots are mixed in a blurry image, the brightness information, such as luminance and chromaticity, may be restored by using an image processing technique. As a result, the brightness detection may be completed by capturing only one picture (or with one additional picture for positioning), and the usage of the ultra-high resolution camera is not necessary.

Note that the method of the present invention is applicable to any type of self-emitting display apparatus where the light is generated by using light emitting devices in pixels. Examples of such self-emitting display apparatuses include, but not limited to, a LED panel, OLED panel, mini-LED panel, micro-LED panel, and micro-OLED panel. In the following descriptions, the light emitting device implemented in each pixel is called "LED" for brevity, but those skilled in the art would know that it may also be an OLED or any other type of device capable of light emission.

Figure 1:
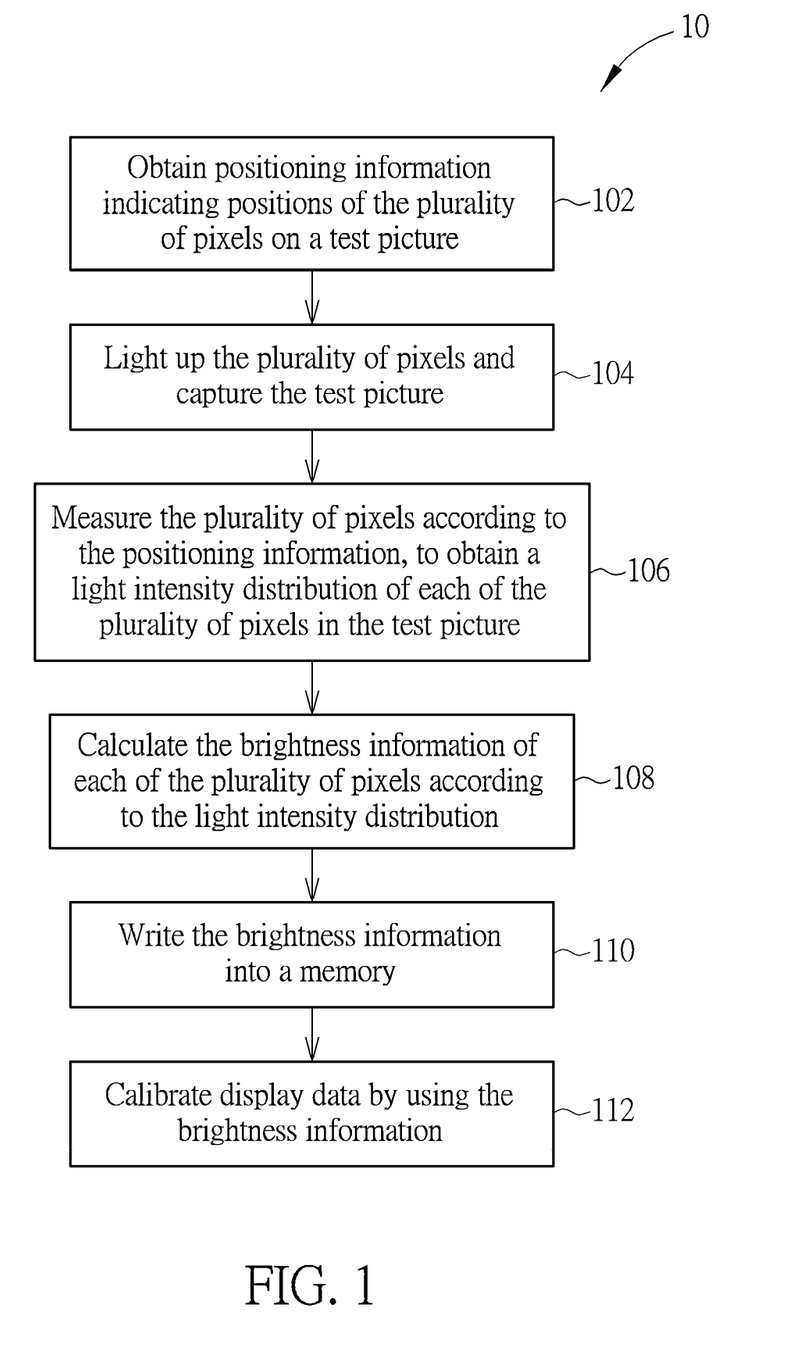
FIG. 1 is a flowchart of a process according to an embodiment of the present invention.

FIG. 1 is a flowchart of a process 10 according to an embodiment of the present invention. The process 10 may be performed to realize brightness detection and brightness calibration for a display panel such as a LED panel, where the display panel may include a plurality of pixels each having a LED. As shown in FIG. 1, the process 10 includes the following steps:

Step 102: Obtain positioning information indicating positions of the plurality of pixels on a test picture.
Step 104: Light up the plurality of pixels and capture the test picture.
Step 106: Measure the plurality of pixels according to the positioning information, to obtain a light intensity distribution of each of the plurality of pixels in the test picture.
Step 108: Calculate the brightness information of each of the plurality of pixels according to the light intensity distribution.
Step 110: Write the brightness information into a memory.
Step 112: Calibrate display data by using the brightness information.

During the brightness detection operation of the process 10, a test picture may be applied to obtain the information of the light spots generated by light emission of the LEDs. Before this information is obtained, the pixels or LEDs on the display panel should be positioned, so as to determine the positions of the pixels on the test picture.

The positioning information may be generated in various manners. In an embodiment, before the test picture for obtaining the brightness information is captured, the positioning information may be obtained by capturing another positioning picture when the LEDS are partially lit up with regular spacing. In the positioning picture, the LEDs may be easily positioned if the light-up spacing is large enough and the light spot generated by each light-up LED on this picture can be recognized clearly.

Figure 2:
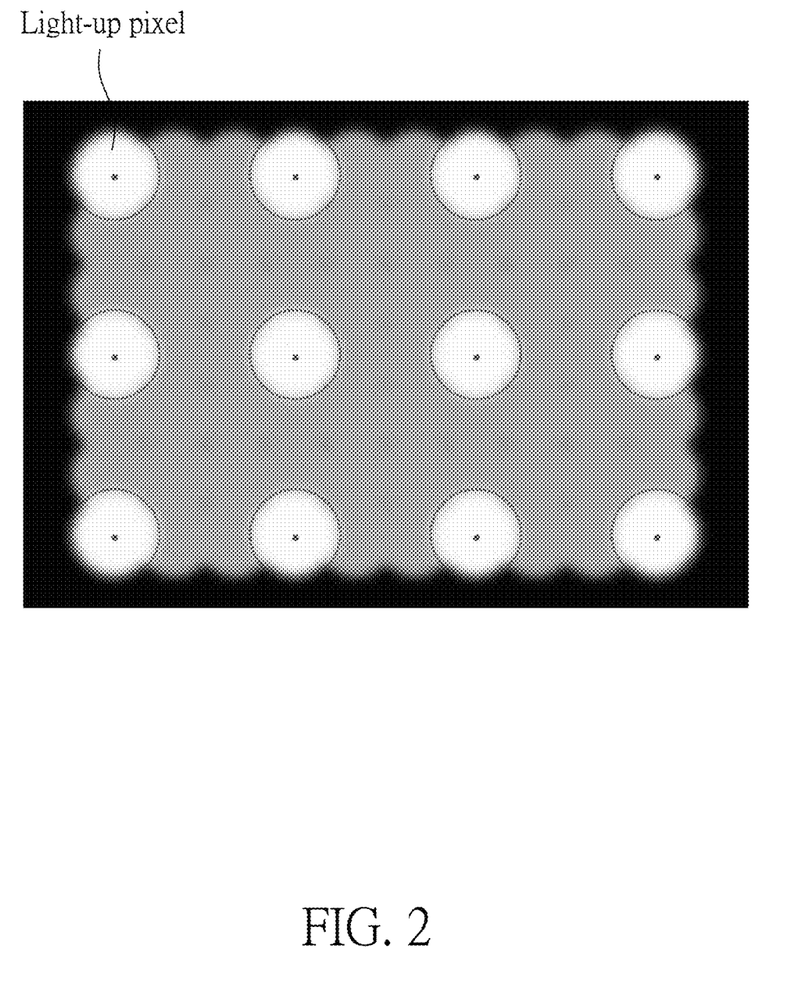
FIG. 2 illustrates an exemplary positioning picture of a display panel where the pixels are partially lit up.

FIG. 2 illustrates an exemplary positioning picture of a display panel, where the pixels are partially lit up. More specifically, the positioning picture is captured when one of every three pixels in a row or column is lit up; that is, every two adjacent light-up pixels are spaced by two non-light-up pixels. With this light-up scheme, the light-up LEDs in these pixels may generate respective light spots which are not interfered with by other light spots, so that the positions of these light-up pixels may be easily obtained according to the positioning picture.

In an embodiment, the positioning picture may be used to determine the position of the LED in each light-up pixel, which may further be applied to determine the central position of the light spot generated by the LED. Based on the distance between the camera and the display panel, the diameter and range of the light spot may further be calculated. This range defines an area in which the detected light may be associated with the corresponding LED.

Figure 3:
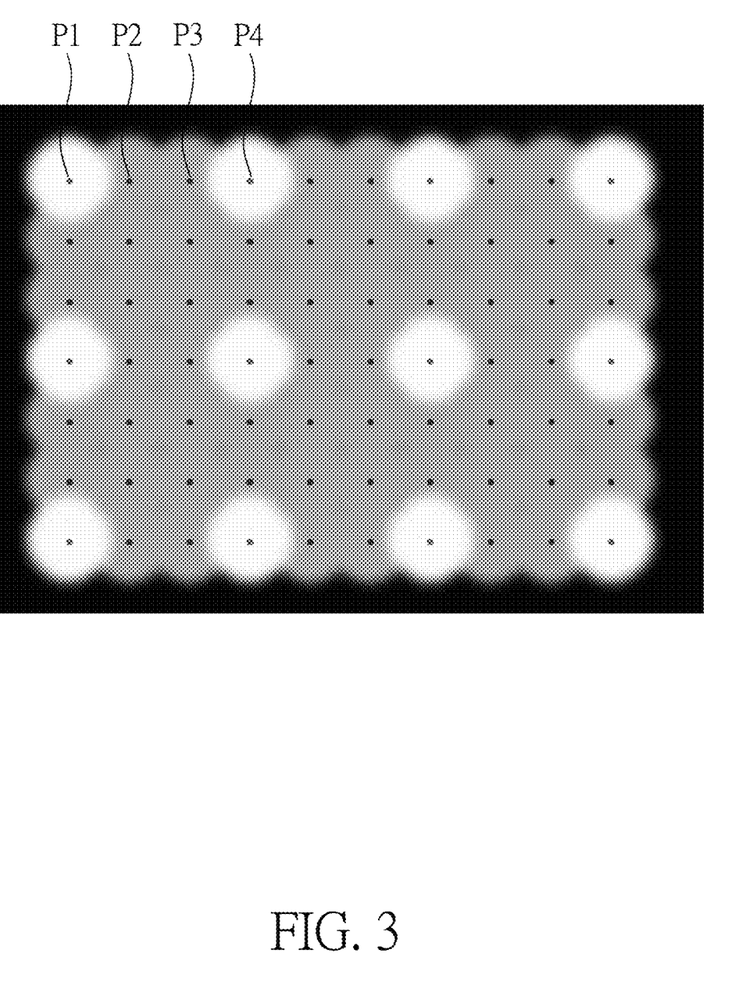
FIG. 3 illustrates a positioning picture of the display panel.

After the positions of the light-up pixels are obtained, the positions of other non-light-up pixels may be determined accordingly. For example, on a similar display panel of which the positioning picture is shown in FIG. 3, the pixels P1 and P4 are lit up while the pixels P2 and P3 are not. Therefore, the positions of the pixels P1 and P4 may be determined according to the light spots generated by the corresponding LEDs and shown on the positioning picture. The positions of the pixels P2 and P3 may then be determined according to the positions of the pixels P1 and/or P4. For example, it is well known that the LEDs/pixels are equally spaced as an array on the display panel, and thus the positions of the non-light-up pixels P2 and P3 may be easily calculated.

Note that the positioning information of the pixels obtained from the positioning picture will be used to determine the positions on the test picture for subsequent brightness detection for each pixel. Therefore, the positioning information may indicate the positions of the pixels on the test picture. For example, the positioning information may contain coordinates on the test picture, where each coordinate represents the central position of a LED in a pixel.

Further note that the positioning method is not limited thereto. In an embodiment, if the camera has enough resolution to differentiate the light spots generated by adjacent pixels, the image on the test picture itself may be applied to perform positioning to obtain the positioning information, where the brightness information may be directly obtained from the test picture.

In another embodiment, the positioning may be performed by partially lighting up different pixels and capturing multiple positioning pictures, so that different pixels may be lit up sequentially to determine their positions. Alternatively, the positioning may be performed by lighting up a set of pixels within one or more regions to determine the positions of the regions, and then determining the positions of each pixel in these regions and nearby regions. In addition, the operations of applying the positions of light-up pixels to deduce the positions of non-light-up pixels may be performed in consideration of the aberration caused by the camera lens. The aberration may be severe if the display panel is larger. Further, the positioning may be performed by using the features of the light spots generated on the picture. Since a light spot is a circular image, a digital image processing algorithm may be applied to detect the center of the circular image to determine the LED position. The positioning may also be performed based on the light intensity distribution of each light spot, where the image corresponding to the position of the LED center may usually have the maximum light intensity.

Further, in an embodiment, the display panel may include one or more light sources except for the light emitting devices included in the pixels. For example, several light sources may be deployed on the panel frame, for positioning the overall display area and the pixels therein by lighting up the light sources in the positioning picture.

In several embodiments, a positioning picture should be captured before the test picture for each display panel. Alternatively, if the relative positions between the camera and those display panels to be detected are fixed with high accuracy, the positioning information of one display panel may be carried to other display panels.

Figure 4:
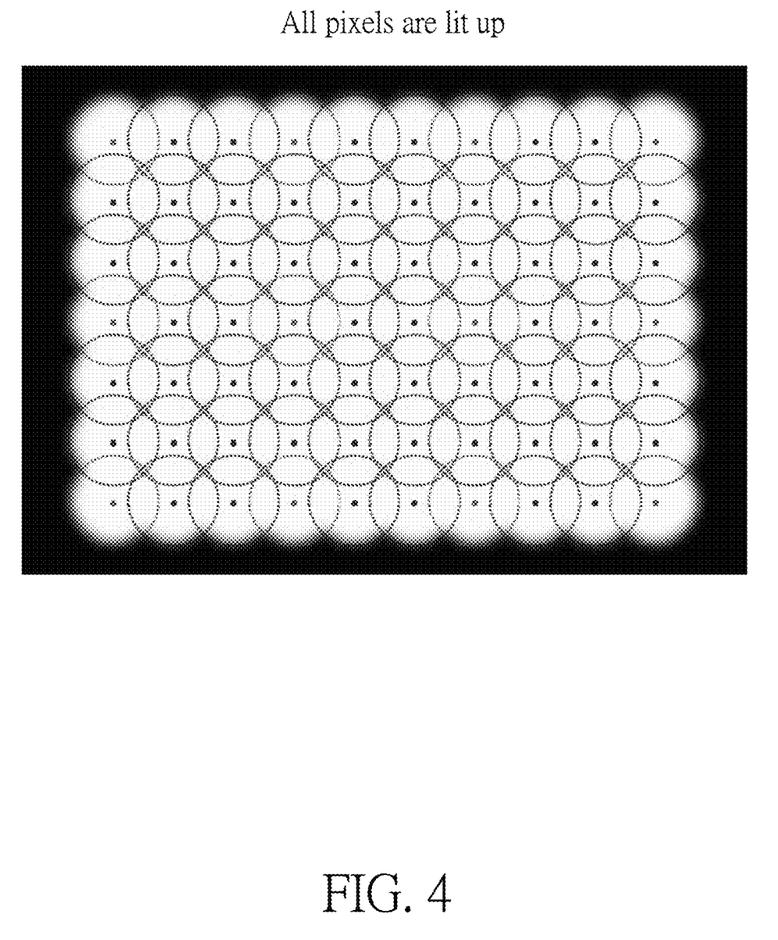
FIG. 4 illustrates a test picture including a blurry image.

Based on the position of each pixel, the brightness of each LED may be measured in the image of the test picture. The test picture may be captured when all of the pixels on the display panel are lit up, and thus the brightness information of each pixel may be obtained through one test picture. The test picture may include a blurry image, as shown in FIG. 4. Each circle may indicate the range of a light spot generated by one pixel, and each black point, which is the center of a circle, may refer to the position of a LED in a pixel.

In order to obtain the brightness information of a LED in each pixel, the range of the light spot generated by the pixel may be predefined, which may be determined based on the positioning information previously obtained. The light intensity distribution in this range may thereby be received. However, due to the small pixel pitch of the display panel, partial of the detected light intensity in the specified range may be contributed by adjacent pixels. More specifically, in the blurry image as shown in FIG. 4, the areas overlapping with adjacent light spots may include the light emitted by adjacent LEDs, such that the brightness information may be interfered with.

This interference problem may be solved by using image processing. In an embodiment, deconvolution may be performed on the received light intensity distribution to generate the actual brightness information of each pixel.

Figure 5:
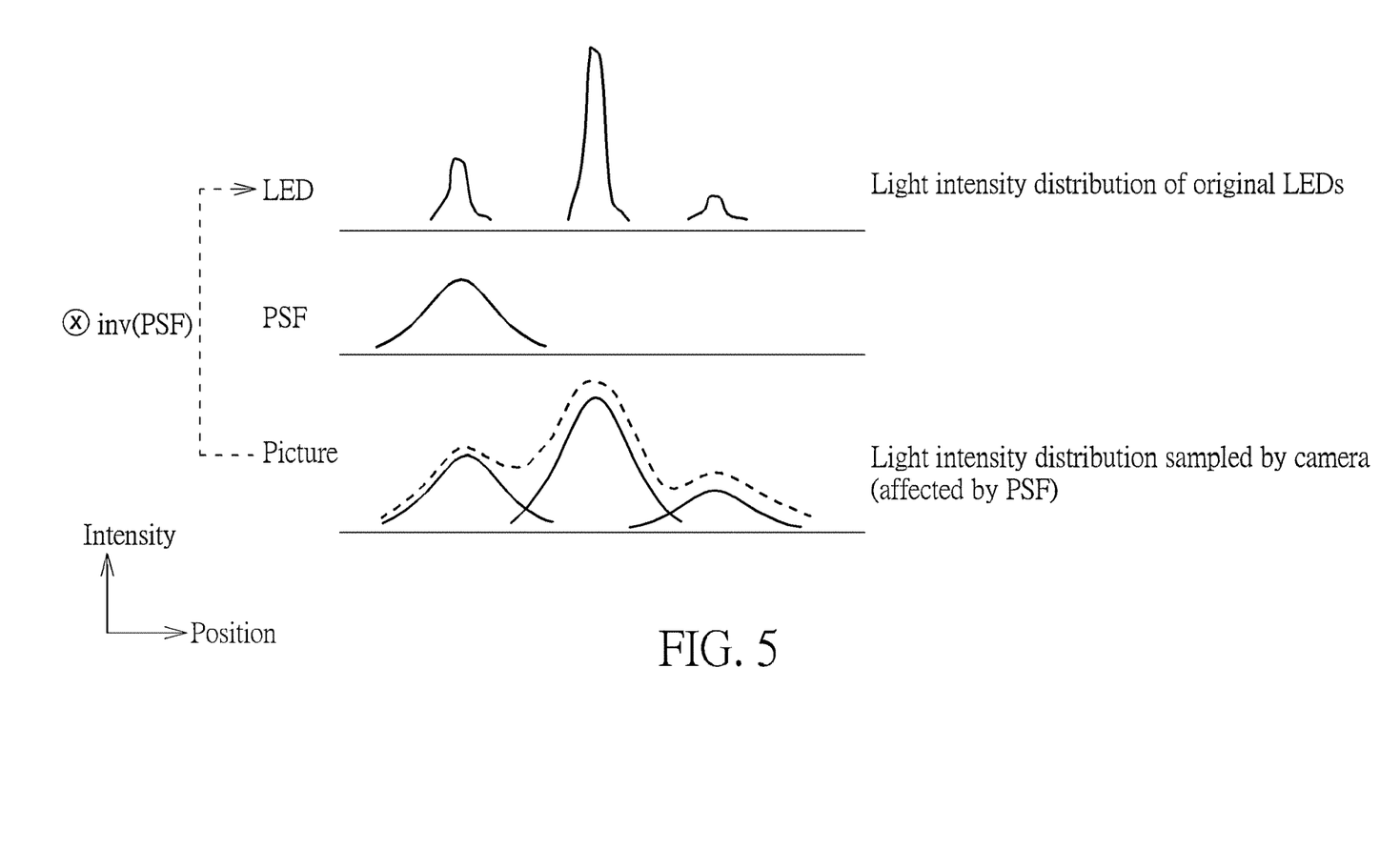
FIG. 5 is a waveform diagram of light intensity distribution emitted by the LEDs and generated on the test picture.

FIG. 5 is a waveform diagram of light intensity distribution emitted by the LEDs and generated on the test picture. The light intensity distribution in the original LEDs may be thin pulses of which the amplitude indicates the light intensity emitted by each LED (denoted by "LED" in FIG. 5). Since the light intensities of these LEDs are different, the brightness of these LEDs should be measured and then calibrated. The light intensity of the LED sampled by the camera becomes a light spot appearing on the picture, where the sampling operation is associated with a point spread function (PSF). More specifically, the light spot in the captured image may be modified with the distribution of the PSF; hence, the sampling of the camera may be equivalent to a convolution operation based on the PSF. In such a situation, the deconvolution based on the PSF may be performed on the light intensity distribution measured in the test picture, so as to remove the unwanted light generated from adjacent LEDs and restore the original light intensity of each LED as the desired brightness information.

In another embodiment, instead of using the deconvolution operation, the brightness information of each pixel may be calculated according to the light intensity distribution by using a neural network (NN) model such as a convolutional neural network (CNN) model. The NN model may be built based on the capturing parameters of the camera such as the aperture size of the lens, exposure time, focal length and resolution, and/or based on the parameters of the display panel such as the pixel pitch, resolution, light style and manufacturing process. Under these parameters and other factors, the present values of the brightness information of each pixel and their optimal values may be obtained to form a training sample. The optimal values of the brightness information may be obtained by capturing a picture in a near enough distance so that a clear image of light spots may be obtained without partially light-up. Based on the present values and the optimal values of the brightness information, an NN model may be built, where invalid information among these data may be removed. Subsequently, several appropriate training samples may be applied to train the NN model, to converge to the optimal parameters in the kernels of the model. After the NN model is completely trained, the image of the test picture may be input to the NN model, to generate an output image including the optimal brightness information of each pixel. The approach using the NN model is also called "deep learning", which is capable of correctly obtaining the brightness information if the training samples are sufficient and appropriate.

Subsequently, the obtained brightness information may be written into a memory, or may be converted into compensation data to be written into the memory, which may be a flash memory implemented in/with the controller for the display panel. During the normal display operation, the brightness information or compensation data may be added to the original display data to correct the brightness of each pixel, so as to improve the uniformity of the display image.

The brightness information may generally refer to the luminous information and/or the chromatic information, which may be regarded as any parameter of a color model, such as the well-known CIE XYZ color space defined by International Commission on Illumination (CIE), but not limited thereto. Note that the camera used in the present invention may form the image parameters in the tristimulus filter system which is designed based on the CIE Color Matching Functions, to emulate the luminance and/or chromaticity sensed by human eyes. The brightness information, such as the luminance and chromaticity, may also be associated with the optical filter applied in the camera.

Figure 6:
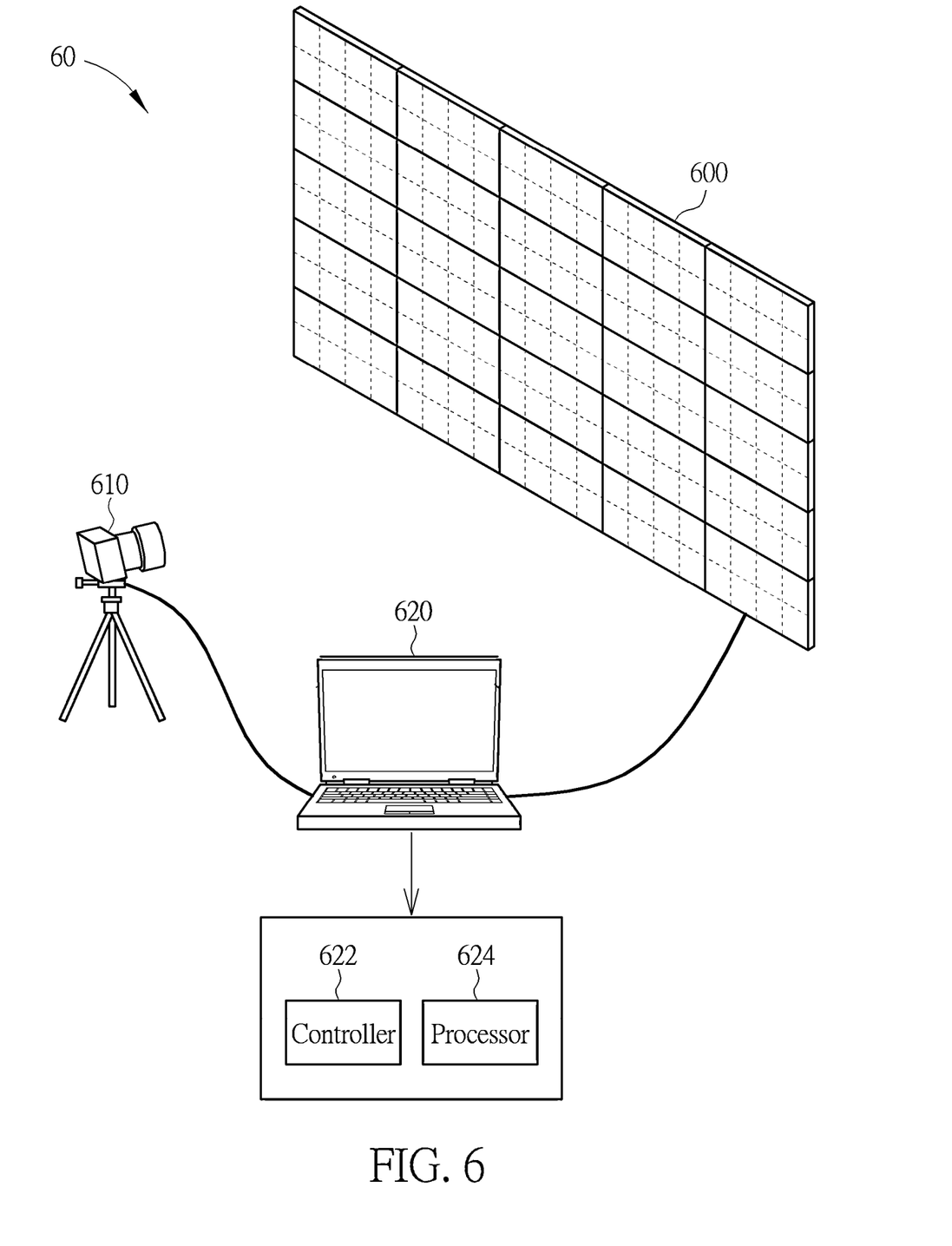
FIG. 6 is a schematic diagram of a panel detection system according to an embodiment of the present invention.

FIG. 6 is a schematic diagram of a panel detection system 60 according to an embodiment of the present invention. The panel detection system 60, which may perform the method of obtaining the brightness information in the present invention, includes a display panel 600, a 2-dimensional (2D) brightness detector 610 and a computer 620. The display panel 600 may be a LED panel or OLED panel having a plurality of pixels or subpixels, where the brightness information of the LEDs in the pixels/subpixels is to be detected or measured. Note that the term "pixel" recited in this disclosure may refer to a sub-pixel having a LED or a pixel having a set of sub-pixels and LEDs.

The 2D brightness detector 610 may be a camera (e.g., industrial camera) capable of capturing a picture of the display panel 600. The 2D brightness detector 610 may capture the test picture for brightness detection, and may also capture the positioning picture if the positioning is performed by partially lighting up the pixels and capturing.

The computer 620, which is coupled to the display panel 600 and the 2D brightness detector 610, may include a controller 622 and a processor 624, for controlling the operations of the display panel 600 and the 2D brightness detector 610.

The controller 622 may control the display panel 600 to show desired images during the process of brightness detection. For example, the controller 622 controls all pixels on the display panel 600 to be lit up when the test picture is captured, and controls the pixels to be partially lit up when the positioning picture is captured. The controller 622 may be a driver circuit for driving the display panel 600. Examples of the controller 622 include, but not limited to, a timing controller, display driver integrated circuit (DDIC), source driver, and system on chip (SoC).

In another embodiment, the images shown on the display panel 600 may be provided by the processor 624, which may send display data for generating the images with entirely light-up pixels (for brightness detection) and/or partially light-up pixels (for positioning) to the controller 622 and the display panel 600. In addition, the processor 624 may obtain the positioning information from the image captured by the 2D brightness detector 610 or through any other positioning approach, measure each pixel and obtain the light intensity associated with each pixel on the test picture, and calculate the brightness information accordingly. The processor 624 may include appropriate algorithms for calculating the brightness information through the deconvolution operation or deep learning. The processor 624 may be any processing device capable of image processing functions included in the computer 620. Examples of the processing device include, but not limited to, a central processing unit (CPU), microprocessor, and microcontroller unit (MCU).

According to the embodiments of the present invention, the operations of brightness detection can be completed by taking only one picture (a test picture) or at most two pictures (including a test picture and a positioning picture). The operation time for panel testing may thereby be saved. In addition, the blurry image in the test picture can be restored to clear image data having brightness information of each pixel; hence, the usage of ultra-high resolution cameras may be avoided, which saves the costs of panel testing. Further, compared to another approach where the brightness information of the LEDs is obtained by lighting up the LEDs with regular spacing, the method of detecting brightness in the test picture where all pixels are lit up may achieve better accuracy. This is because almost all pixels are lit up under normal display of a screen, so that the behavior of the display panel (including current consumption, temperature, and channel coupling) in the brightness detection procedure of the present invention is much closer to the case in normal display. Thus, the present invention allows the brightness detection and calibration to be performed in a scenario similar to the normal display behavior.

Please note that the present invention aims at providing a novel method of obtaining brightness information of a display panel. Those skilled in the art may make modifications and alterations accordingly. As mentioned above, the present invention is applicable to any type of self-emitting display apparatuses. Specifically, as for a large-scale LED splicing screen, it is difficult to perform brightness detection by taking multiple pictures or using other conventional approaches. According to the present invention, if the positioning information is available, the camera may take only one test picture, and the brightness information may be extracted from the image on the test picture through image processing operations even if this image is blurry. This simplifies the efforts and reduces the costs of panel detection in the production process.

To sum up, the present invention provides a brightness detection method and a panel detection system for obtaining the brightness information of a display panel. The positioning may be performed first, to obtain positioning information of the pixels on a test picture. In an embodiment, the positioning information may be obtained by capturing a positioning picture when the LEDs are partially lit up with regular spacing. Subsequently, the test picture may be captured, to obtain the brightness information of each pixel based on the positioning information. If the image on the test picture is blurry, image processing may be performed on the image to obtain the desired brightness information, which may include luminance and chromaticity of the LED. The image processing may be performed by using deconvolution operation, or using the NN model through deep learning. The brightness detection method of the present invention is time-saving and cost-saving, and is able to obtain more accurate brightness information for calibration.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of obtaining brightness information of a display panel comprising a plurality of pixels, the method comprising:
    obtaining positioning information indicating places of the plurality of pixels located on a test picture;
    lighting up the plurality of pixels and capturing the test picture;
    measuring the plurality of pixels according to the positioning information, to obtain a light intensity distribution of each of the plurality of pixels in the test picture; and
    calculating the brightness information of each of the plurality of pixels according to the light intensity distribution, to restore an original light intensity delivered by a light emitting device in each of the plurality of pixels;
    wherein the test picture is captured when all of the plurality of pixels are lit up.

2. A panel detection system comprising:
    a display panel comprising a plurality of pixels;
    a controller, coupled to the display panel, to light up the plurality of pixels;
    a 2-dimensional brightness detector, to capture a test picture when the plurality of pixels are lit up; and
    a processor, coupled to the controller and the 2-dimensional brightness detector, to:
        obtain positioning information indicating places of the plurality of pixels located on the test picture;
        measure the plurality of pixels according to the positioning information, to obtain a light intensity distribution of each of the plurality of pixels in the test picture; and
        calculate brightness information of each of the plurality of pixels according to the light intensity distribution, to restore an original light intensity delivered by a light emitting device in each of the plurality of pixels;
    wherein the 2-dimensional brightness detector captures the test picture when all of the plurality of pixels are lit up.

3. A method of obtaining brightness information of a display panel comprising a plurality of pixels, the method comprising:
    obtaining positioning information indicating places of the plurality of pixels located on a test picture;
    lighting up the plurality of pixels and capturing the test picture;
    measuring the plurality of pixels according to the positioning information, to obtain a light intensity distribution of each of the plurality of pixels in the test picture; and
    calculating the brightness information of each of the plurality of pixels according to the light intensity distribution;
    wherein the step of obtaining the positioning information comprises:
        partially lighting up the plurality of pixels, wherein every two of a plurality of light-up pixels are spaced by at least one non-light-up pixel among the plurality of pixels;
        capturing a positioning picture before capturing the test picture, wherein the plurality of pixels are partially lit up in the positioning picture; and
        obtaining the places of the plurality of pixels according to the positioning picture.

4. The method of claim 3, wherein the step of obtaining the positioning information further comprises:

determining a plurality of places of the plurality of light-up pixels according to a plurality of light spots generated by the plurality of light-up pixels; and determining a plurality of places of a plurality of non-light-up pixels according to at least one of the plurality of places of the plurality of light-up pixels.

5. The method of claim 4, wherein the step of obtaining the positioning information further comprises:

determining a first position of a first light-up pixel among the plurality of light-up pixels according to a first light spot generated by the first light-up pixel;

determining a second position of a second light-up pixel among the plurality of light-up pixels according to a second light spot generated by the second light-up pixel; and determining a third position of a third non-light-up pixel among the plurality of non-light-up pixels according to the first position and the second position.

6. The method of claim 3, wherein the step of obtaining the positioning information comprises:

obtaining the positioning information according to an image on the test picture.

7. The method of claim 3, wherein the step of obtaining the positioning information comprises:

obtaining the positioning information according to a light source of the display panel except for the plurality of pixels.

8. The method of claim 3, wherein the brightness information comprises at least one of luminous information and chromatic information.

9. The method of claim 3, wherein the step of measuring the plurality of pixels according to the positioning information to obtain the light intensity distribution comprises:

determining a range corresponding to a light spot generated by a first pixel among the plurality of pixels according to the positioning information; and receiving the light intensity distribution of the first pixel in the range.

10. The method of claim 3, wherein the step of calculating the brightness information of each of the plurality of pixels according to the light intensity distribution comprises:

performing deconvolution on the light intensity distribution to generate the brightness information.

11. The method of claim 10, wherein the deconvolution is performed according to a point spread function (PSF).

12. The method of claim 3, wherein the step of calculating the brightness information of each of the plurality of pixels according to the light intensity distribution comprises:

calculating the brightness information according to the light intensity distribution by using a neural network model.

13. A panel detection system comprising:
a display panel comprising a plurality of pixels;
a controller, coupled to the display panel, to light up the plurality of pixels;
a 2-dimensional brightness detector, to capture a test picture when the plurality of pixels are lit up; and
a processor, coupled to the controller and the 2-dimensional brightness detector, to:

obtain positioning information indicating places of the plurality of pixels located on the test picture;

measure the plurality of pixels according to the positioning information, to obtain a light intensity distribution of each of the plurality of pixels in the test picture; and calculate brightness information of each of the plurality of pixels according to the light intensity distribution;

wherein the processor obtains the positioning information by performing steps of:

partially lighting up the plurality of pixels, wherein every two of a plurality of light-up pixels are spaced by at least one non-light-up pixel among the plurality of pixels;

capturing a positioning picture before capturing the test picture, wherein the plurality of pixels are partially lit up in the positioning picture; and obtaining the places of the plurality of pixels according to the positioning picture.

14. The panel detection system of claim 13, wherein the processor obtains the positioning information by further performing steps of:

determining a plurality of places of the plurality of light-up pixels according to a plurality of light spots generated by the plurality of light-up pixels; and determining a plurality of places of a plurality of non-light-up pixels according to at least one of the plurality of places of the plurality of light-up pixels.

15. The panel detection system of claim 14, wherein the processor obtains the positioning information by further performing steps of:

determining a first position of a first light-up pixel among the plurality of light-up pixels according to a first light spot generated by the first light-up pixel;

determining a second position of a second light-up pixel among the plurality of light-up pixels according to a second light spot generated by the second light-up pixel; and determining a third position of a third non-light-up pixel among the plurality of non-light-up pixels according to the first position and the second position.

16. The panel detection system of claim 13, wherein the processor obtains the positioning information according to an image on the test picture.

17. The panel detection system of claim 13, wherein the processor obtains the positioning information according to a light source of the display panel except for the plurality of pixels.

18. The panel detection system of claim 13, wherein the brightness information comprises at least one of luminous information and chromatic information.

19. The panel detection system of claim 13, wherein the processor measures the plurality of pixels according to the positioning information to obtain the light intensity distribution by performing steps of:

determining a range corresponding to a light spot generated by a first pixel among the plurality of pixels according to the positioning information; and receiving the light intensity distribution of the first pixel in the range.

20. The panel detection system of claim 13, wherein the processor performs deconvolution on the light intensity distribution to generate the brightness information.

21. The panel detection system of claim 20, wherein the processor performs the deconvolution according to a point spread function (PSF).

22. The panel detection system of claim 13, wherein the processor calculates the brightness information according to the light intensity distribution by using a neural network model.

* * * * *